United States Patent Office 2,862,017
Patented Nov. 25, 1958

2,862,017
BENZYL ESTERS OF THIOPHOSPHORIC ACIDS AND THEIR PRODUCTION

Gerhard Schrader, Opladen, and Walter Lorenz, Wuppertal-Elberfeld, Germany, assignors to Farbenfabriken Bayer Aktiengesellschaft, Leverkusen, Germany, a corporation of Germany No Drawing. Application April 24, 1956
Serial No. 580,176

Claims priority, application Germany May 3, 1955

8 Claims. (Cl. 260—461)

This invention relates to thiophosphoric acid esters of the general formula

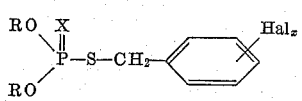

in which R is a lower alkyl, X stands for O or S, halogen is chlorine or bromine and $x$ stands for an integer from 1 to 3.

It is known that esters of nitrobenzyl-thio-phosphoric acids are used as pest control agents and their manufacture is disclosed in United States Patent 2,609,383.

It has now been found that the chlorobenzyl esters of esters of thiolphosphoric acids or thiol-thiono-phosphoric acids, which may easily be obtained, show improved insecticidal properties and a lower toxicity. They distinguish themselves further by a very good acaricidal action whilst having at the same time only a small action on warm-blooded animals.

These new esters are obtained by condensation of salts, preferably ammonium salts, of O,O-dialkyl-thiol- or thiono-thiol-phosphoric acid with halogenated benzyl halides, especially chlorides. Examples of other salts which may be used are alkali metal salts such as sodium, potassium or other alkali metal salts. The reaction is preferably carried out in organic solvents such as acetone or alcohol. Other suitable solvents are ether, benzene, and chlorinated hydrocarbons. The reaction of the free O,O-dialkyl-thiono-thiol-phosphoric acids with the halogenated benzyl halides may be carried out in the presence of a tertiary base, e. g. trimethyl amine, triethyl amine, N-methyl piperidine and pyridine as acid binding agent preferably also in an organic solvent. The reaction can be carried out at temperatures between 0 and 150° C., preferably between 10 and 70° C. The following reaction scheme illustrates the conversion of the ammonium salt of O,O-diethyl-thiol-phosphoric acid with 3.4-dichlorobenzyl chloride:

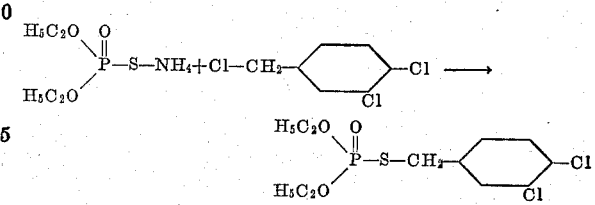

The action on red spiders and on plant lice as well as the only small toxicity of the claimed esters is apparent from the following table. The action of the new compounds on plant lice is distinctly superior to that of the

TABLE

| | | $(H_5C_2O)_2\overset{O}{\underset{\|}{P}}-S-CH_2-Ar$ | | | | $(H_5C_2O)_2\overset{S}{\underset{\|}{P}}-S-CH_2-Ar$ | | | |
|---|---|---|---|---|---|---|---|---|---|
| Ar | rat per os LD 100 | effect on red spiders | | effect on plant lice | | rat per os LD 100 | effect on red spiders | | effect on plant lice | |
| | | conc. | mortality | conc. | mortality | | conc. | mortality | conc. | mortality |
| ⟨⟩ | Mg./kg. 250 | Percent 0.1 | Percent 0 | Percent 0.1 | Percent 0 | Mg./kg. 1,000 | Percent 0.1 | Percent 0 | Percent 0.1 | Percent 0 |
| ⟨⟩-Cl | 500 | 0.01 | 100 | 0.01 | 100 | 1,000 | 0.01 | 100 | 0.1 | 100 |
| Cl-⟨⟩ | 250 | 0.001 | 100 | 0.01 | 100 | 1,000 | 0.001 | 100 | 0.1 | 100 |
| Cl-⟨⟩-Cl | 500 | 0.01 | 100 | 0.1 | 70 | >1,000 | 0.001 | 100 | 0.1 | 100 |
| ⟨⟩(Cl,Cl) | 250 | 0.001 | 100 | 0.1 | 0 | 500 | 0.01 | 100 | 0.1 | 70 |
| ⟨⟩-NO₂ | 10 | 0.01 | 100 | 0.1 | 0 | 100 | 0.1 | 100 | 0.01 | 100 |
| ⟨⟩(NO₂) | 100 | 0.001 | 100 | 0.1 | 0 | 250 | 0.01 | 100 | 0.1 | 100 |
| NO₂-⟨⟩ | 25 | 0.001 | 100 | 0.1 | 0 | 100 | 0.001 | 100 | 0.1 | 0 | known nitro compounds whilst the toxicity is less than that of the nitro compounds.

The following examples are given for the purpose of illustrating the invention.

*Example 1*

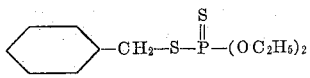

56 grams of (0.3 mol) of diethyl-dithiophosphoric acid and 39 grams of benzyl chloride are dissolved in 150 millilitres of benzene. 25 grams (0.3 mol) of pyridine are added dropwise at 20° C. which rapidly raises the temperature to 45° C. To complete the reaction, the mixture is heated to 60 to 65° C. for an hour and, after cooling, filtered off by suction from pyridine hydrochloride; the benzene solution is washed with water, and finally dried over calcium chloride. After the solvent is distilled off, O,O-diethyl-S-benzyl thionophosphate is obtained, which boils at 152 to 153° C. under a pressure of 2 millimetres of mercury. It is a pale yellow water-insoluble oil. The yield is 88.5 percent.

*Example 2*

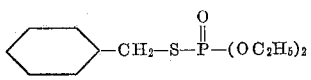

60 grams of the ammonium salt of diethyl-thio-phosphoric acid are dissolved in 200 millimetres of acetone. 39 grams (0.3 mol) of benzyl chloride are added dropwise at 40 to 45° C., and the mixture is then heated to 60 to 65° C. for an hour. After cooling, the mixture is poured into water, the oil thus separated out is dissolved in benzene and the solution is washed with water and dried over sodium sulphate. After distilling, O,O-diethyl-S-benzyl phosphate is obtained as a yellowish oil, B. P. 160° C./3 mm. Hg. Yield 44 grams.

*Example 3*

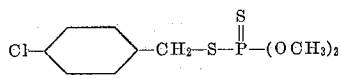

50 grams of dimethyl-dithiophosphoric acid (94 percent) are dissolved in 200 millilitres of benzene, and neutralised with 25 grams of pyridine. A solution of 48 grams of p-chlorobenzyl chloride in 50 millilitres of benzene is added dropwise at 40 to 50° C. After heating for an hour to 60° to 65° C., the mixture is allowed to cool and filtered off by suction from pyridine hydrochloride; the benzene solution is washed first with dilute hydrochloric acid and then with water and dried over sodium sulphate. O,O-dimethyl-S-chlorobenzyl-thionophosphate is obtained by fractionation as a colourless oil, B. P. 98–100° C./0.01 mm. Hg. In a similar manner there are obtained O,O - di - n - propyl - S - n - chlorobenzyl-thionophosphate, B. P. 107° C./0.01 mm. Hg, and O,O-di -isopropyl - 1 - p - chlorobenzyl - thiono - phosphate, B. P. 120° C./0.4 mm. Hg, as a colourless to pale yellow oil.

*Example 4*

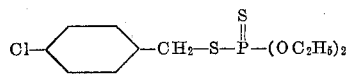

1.22 kilograms of diethyl-dithiophosphoric acid (97.4 percent) are dissolved in 2.4 litres of ethanol and converted into the ammonium salt by introduction of ammonia with cooling with water. 966 grams of p-chlorobenzyl chloride are rapidly added at 20 to 30° C. The reaction proceeds with slow rise in temperature to 50 to 60° C. The reaction is completed by subsequently heating at this temperature for 3 hours. After cooling, the mixture is filtered by suction to remove the precipitated ammonium chloride. The solvent is distilled off under vacuum, the residue is dissolved in methylene chloride, and repeatedly shaken out with water. After drying over sodium sulphate and distilling off the methylene chloride, 1.79 kilograms (90 percent of theoretical yield) of O,O-diethyl-S-p-chlorobenzyl thionophosphate are obtained as a pale yellowish water-insoluble oil. The ester boils at 105 to 107° C./0.01 mm. Hg and is obtained as an almost colourless oil.

*Example 5*

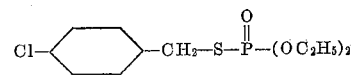

60 grams of the ammonium salt of diethyl-thiophosphoric acid are dissolved in 200 millilitres of acetone. 48 grams of p-chlorobenzyl chloride dissolved in a little acetone are added dropwise at 40 to 50° C. After stirring for an hour at 60 to 65° C. the mixture is poured into water and the oil separated out is dissolved in benzene, and the benzene solution is repeatedly washed with water and dried. After distillation of the solvent and fractionation, 40 grams of O,O-diethyl-S-4-chlorobenzyl phosphate are obtained as a golden yellow oil, B. P. 177° C./3 mm. Hg.

*Example 6*

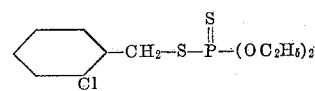

60 grams of diethyl-dithiophosphoric acid are dissolved in 200 millilitres of benzene and neutralised with 25 grams of pyridine while cooling. 48 grams of O-chlorobenzyl chloride are added dropwise at 40 to 45° C. and the mixture is then heated for an hour to 60 to 65° C. After cooling, the mixture is filtered off by suction from pyridine hydrochloride, the benzene solution is washed first with dilute hydrochloric acid to remove pyridine, then with water, and the solution dried over sodium sulphate. By fractionation, 48 grams of O,O-diethyl-S-o-chlorobenzyl-thiono-phosphate, B. P. 169–171° C./2 mm. Hg, are obtained.

*Example 7*

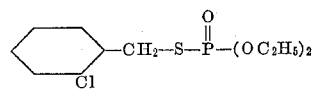

To a solution of 60 grams of the ammonium salt of diethyl-thiophosphoric acid in 150 millilitres of acetone is added dropwise at 40 to 45° C. a solution of 48 grams of o-chlorobenzyl chloride in 50 millilitres of acetone. The mixture is stirred for an hour at 50 to 60° C., and worked up as described in Example 5. The O,O-diethyl-S-2-chlorobenzyl phosphate boils at 171° C./2 mm. Hg. It is obtained as a reddish yellow oil in a yield of 29 grams.

*Example 8*

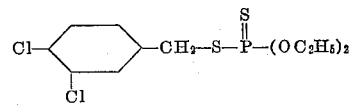

60 grams of diethyl-dithiophosphoric acid are dissolved in 200 millilitres of benzene and neutralised with cooling with 25 grams of pyridine. 58.5 grams of 3.4-dichlorobenzyl chloride are added dropwise at 40 to 45° C., the mixture is heated for an hour to 60 to 65° C., and worked up as described in the preceding examples. By fractionation, O,O-diethyl-S-3.4-dichlorobenzyl-thionophosphate is obtained as a yellowish orange water-insoluble oil, boiling at 180° C./2 mm. Hg. in a yield of 49 grams.

In a similar manner, from diethyl-dithiophosphoric acid and 2.6-dichlorobenzyl chloride, O,O-diethyl-S-2.6-dichlorobenzyl - thionophosphate is obtained, B. P. 182° C./2 mm. Hg. Yield: 49.5 percent of the theoretical.

Example 9

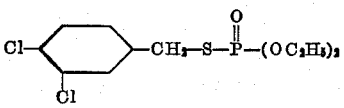

60 grams of the ammonium salt of diethyl-thiophosphoric acid are dissolved in 150 millilitres of acetone and heated with 58.5 grams of 3.4-dichlorobenzyl chloride to 40 to 45° C. The mixture is stirred for 2 hours at 60 to 65° C., allowed to cool, the reaction mixture is poured into water and the oil separated out is taken up in benzene. After being worked up, 42 grams of O,O-diethyl-S-3.4-dichlorobenzyl phosphate, B. P. 190° C./2 mm. Hg, are obtained as a pale yellow water-insoluble oil.

In a similar manner O,O-diethyl-S-2.6-dichlorobenzyl phosphate, B. P. 183° C./3 mm. Hg, is obtained in 51 percent yield of the theoretical.

We claim:

1. A thiophosphoric acid ester having the general formula:

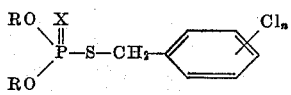

in which R is lower alkyl, X is a chalkogen having an atomic weight between 16 and 32, and *n* is an integer from one to three.

2. A compound of the formula

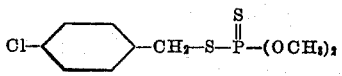

3. A compound of the formula

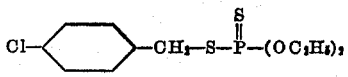

4. A compound of the formula

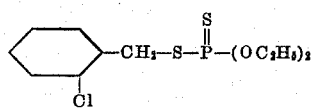

5. A compound of the formula

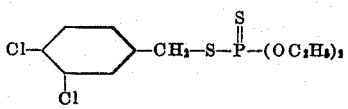

6. A compound of the formula

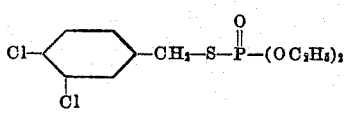

7. A thiophosphoric acid ester of claim 1 wherein each R is methyl.

8. A thiophosphoric acid ester of claim 1 wherein each R is ethyl.

References Cited in the file of this patent
UNITED STATES PATENTS

| | | |
|---|---|---|
| 2,266,514 | Romieux et al. | Dec. 16, 1941 |
| 2,609,383 | Craig | Sept. 2, 1952 |